United States Patent
White et al.

(10) Patent No.: US 11,981,285 B2
(45) Date of Patent: May 14, 2024

(54) METHOD AND APPARATUS FOR PREVENTING THEFT OF CATALYTIC CONVERTER

(71) Applicant: SWIVLER, Inc., Woodland, WA (US)

(72) Inventors: Rick A. White, Woodland, WA (US); Nick J. Smit, Vancouver, WA (US)

(73) Assignee: SWIVLER, Inc., Woodland, WA (US)

( * ) Notice: Subject to any disclaimer, the term of this patent is extended or adjusted under 35 U.S.C. 154(b) by 0 days.

(21) Appl. No.: 17/531,993

(22) Filed: Nov. 22, 2021

(65) Prior Publication Data

US 2023/0158997 A1 May 25, 2023

(51) Int. Cl.
*B60R 25/20* (2013.01)
*B60R 25/10* (2013.01)
*G08B 3/00* (2006.01)
*G08B 29/12* (2006.01)

(52) U.S. Cl.
CPC .......... *B60R 25/1004* (2013.01); *B60R 25/20* (2013.01); *G08B 3/00* (2013.01); *G08B 29/12* (2013.01); *B60R 2025/1013* (2013.01)

(58) Field of Classification Search
CPC ................ B60R 25/1004; B60R 25/20; B60R 2025/1013; G08B 3/00; G08B 29/12
See application file for complete search history.

(56) References Cited

U.S. PATENT DOCUMENTS

| | | | | |
|---|---|---|---|---|
| 3,824,540 A | * | 7/1974 | Smith, II | E05B 45/005 340/432 |
| 3,848,229 A | * | 11/1974 | Perron | G07C 9/00182 902/4 |
| 3,974,492 A | * | 8/1976 | Girismen | G08B 29/181 340/687 |
| 4,620,182 A | * | 10/1986 | Keifer | G08B 13/1463 340/568.4 |
| 4,909,199 A | * | 3/1990 | Kurozu | B60R 25/02142 70/352 |
| 4,958,084 A | * | 9/1990 | Carlo | B60R 25/045 340/428 |

(Continued)

FOREIGN PATENT DOCUMENTS

| | | | |
|---|---|---|---|
| CN | 203520940 U | * | 4/2014 |
| JP | 2013201799 A | * | 10/2013 |

*Primary Examiner* — Nay Tun
(74) *Attorney, Agent, or Firm* — Emerson, Thomson & Bennett, LLC; Roger D. Emerson; Matt J. Wilson

(57) ABSTRACT

Provided in this disclosure is an antitheft system for an automotive catalytic converter including a wire loop for conducting a current to establish an electrical circuit. One or more hose clamps are provided for securing some or all of the wire loop alongside a vehicle exhaust system including the catalytic converter. A monitoring circuit is in electrical communication with the wire loop, for monitoring the electrical circuit established in the wire loop. A detector circuit is connected to the monitoring circuit, for detecting a discontinuity in the electrical circuit indicative of a disconnection of the wire loop. An alarm circuit is connected to the detector circuit, for activating an alarm upon detection of the discontinuity in the electrical circuit. An arming circuit includes a detection circuit for detecting insertion of a removable key, and another detection circuit for detecting insertion of the wire loop which establishes the electrical circuit.

2 Claims, 3 Drawing Sheets

(56) References Cited

U.S. PATENT DOCUMENTS

| | | | | |
|---|---|---|---|---|
| 5,074,672 A * | 12/1991 | Emery | | H02K 19/36 |
| | | | | 374/E1.019 |
| 5,408,213 A * | 4/1995 | Ungarsohn | | B62H 5/20 |
| | | | | 340/568.1 |
| 5,517,848 A * | 5/1996 | Hosoya | | F02D 35/0038 |
| | | | | 73/23.31 |
| 5,612,878 A * | 3/1997 | Joao | | B60R 25/043 |
| | | | | 455/456.1 |
| 5,729,191 A * | 3/1998 | Allen | | G07C 9/00182 |
| | | | | 340/12.54 |
| 5,889,463 A * | 3/1999 | Judd | | B60R 25/1001 |
| | | | | 340/432 |
| 6,690,277 B1 * | 2/2004 | Hansen | | G08B 13/1454 |
| | | | | 340/568.2 |
| 8,002,232 B2 | 8/2011 | Meislahn | | |
| 8,068,027 B2 * | 11/2011 | Auerbach | | E05B 39/00 |
| | | | | 340/539.11 |
| 8,094,019 B1 * | 1/2012 | Kelsch | | G08B 13/1454 |
| | | | | 340/568.4 |
| 8,910,986 B1 * | 12/2014 | Appukutty | | B60R 19/483 |
| | | | | 296/187.03 |
| 8,963,699 B2 * | 2/2015 | Potter | | B60R 25/20 |
| | | | | 70/57.1 |
| 2003/0128118 A1 * | 7/2003 | Leyden | | G08B 13/1472 |
| | | | | 340/568.2 |
| 2004/0135680 A1 * | 7/2004 | Jacobs | | B60R 25/21 |
| | | | | 340/426.12 |
| 2005/0179548 A1 * | 8/2005 | Kittel | | G08B 13/1445 |
| | | | | 340/568.2 |
| 2010/0052907 A1 * | 3/2010 | Shannon | | B62H 5/00 |
| | | | | 340/568.6 |
| 2011/0036130 A1 * | 2/2011 | Hisler | | F01N 3/28 |
| | | | | 70/57.1 |
| 2011/0254661 A1 * | 10/2011 | Fawcett | | G08B 13/2434 |
| | | | | 340/5.61 |
| 2012/0299755 A1 * | 11/2012 | Jones | | E05B 45/005 |
| | | | | 340/990 |
| 2013/0249682 A1 * | 9/2013 | Van Wiemeersch | | H02J 50/60 |
| | | | | 320/108 |
| 2014/0104048 A1 * | 4/2014 | De Kock | | G08B 13/1654 |
| | | | | 340/429 |
| 2014/0176320 A1 * | 6/2014 | Reed | | F01N 3/28 |
| | | | | 340/426.24 |
| 2014/0266654 A1 * | 9/2014 | Parker | | B60R 25/00 |
| | | | | 340/426.25 |

* cited by examiner

METHOD AND APPARATUS FOR PREVENTING THEFT OF CATALYTIC CONVERTER

I. BACKGROUND

A. Technical Field

This invention generally pertains to the field of antitheft devices. This invention specifically pertains to the field of electronic antitheft devices provided to deter or prevent theft of a catalytic converter in an automobile or SUV.

B. Description of Related Art

Catalytic converters are used in the exhaust systems of automobiles for the purpose of improving air quality by reducing toxic emissions, including carbon monoxide, unburnt hydrocarbons, and nitrogen oxide compounds by chemically catalyzing the emissions into common compounds such as carbon dioxide and water. Catalytic converters can include precious metals such as platinum, palladium and rhodium which are effective catalysts for producing the catalyzing reaction.

Because of the precious metals, catalytic converters are very expensive, making them the target of theft. Thus, there is a general need to protect automobiles from catalytic converter theft. This need is especially great at outdoor lots of automobile dealerships, where many vehicles are closely accessible and especially vulnerable to theft at nighttime, enabling the thieves to procure several catalytic converters at a time before detection by police or security.

Mechanical devices are known for protecting catalytic converters from theft. One such known device is "The Cat-Lock" sold by Monat Technologies. Such mechanical devices are based on the premise of surrounding the catalytic converter with a locked steel structure which is difficult or impossible to penetrate, and which can include an impervious steel cable for securing the catalytic converter to the vehicle frame.

While such mechanical deterrents are effective, they are expensive and thus can be cost-prohibitive for deploying with multiple vehicles, especially at an automobile dealership where hundreds of vehicles are present. Other schemes are known for protecting catalytic converters, but these also tend to be complicated and thus expensive. There is therefore a need for an inexpensive and effective deterrent to catalytic converter theft.

II. SUMMARY

Provided in this disclosure is an antitheft system including a wire loop for completing the electrical circuit. One or more securing components are provided for securing some or all of the wire loop in contact with the device(s) to be protected. In one aspect of the present invention, the device to be protected can be an automotive catalytic converter and wherein the securing component(s) can be one or more fixed clamps for securing some portion or the entirety of the wire loop alongside a vehicle exhaust system including the catalytic converter.

A monitoring circuit is provided in electrical communication with the wire loop, for monitoring the electrical circuit monitored by the wire loop. A detector circuit is connected to the monitoring circuit, for detecting a discontinuity in the electrical circuit indicative of a disconnection or separating of the wire loop(s). An alarm circuit is connected to the detector circuit, for activating an alarm upon detection of the discontinuity in the electrical circuit.

The present antitheft system further includes a key-activated arming circuit having a key detection circuit for detecting a key insertion signal indicative of insertion of a removable key. The arming circuit also includes a wire loop detection circuit for detecting a wire loop(s) insertion signal indicative of insertion of the wire loop corresponding to establishment of the electrical circuit. The arming circuit also includes a control logic circuit which: 1) receives the key insertion signal from the key detection circuit, 2) subsequently receives the wire loop(s) insertion signal from the wire loop detection circuit, and 3) subsequently arms the arming circuit. An alarm deactivation circuit is also included for receiving a second key insertion signal from the key detection circuit and deactivating the alarm circuit to disable the alarm. In a preferred embodiment, the key detection circuit includes a key switch, actuated by insertion of the key, to produce the key insertion signal.

As a special feature, the present removable key includes a shaft and the key detection circuit cooperates with a socket, mounted onto an exterior of a housing, for receiving the shaft of the removable key. Furthermore, the wire loop includes a coaxial plug for electrically connecting respective two ends of the wire loop(s). The wire loop detection circuit cooperates with a coaxial socket, mounted onto an exterior of a housing, for receiving the coaxial plug of the wire loop. The present antitheft system also includes a test circuit comprising a user-actuated switch connected to the alarm circuit, for test activating the alarm. Also, the alarm preferably includes a sound transducer for generating an audible alarm signal.

According to one aspect, the present antitheft system provides an electronic deterrent to the theft of catalytic converters.

According to another aspect, the present antitheft system is inexpensive and thus cost-effective for deploying with multiple vehicles.

According to an additional aspect, the present antitheft system is uncomplicated while remaining an effective deterrent to catalytic converter theft.

Other benefits and advantages of this invention will become apparent to those skilled in the art to which it pertains upon reading and understanding of the following detailed specification.

III. BRIEF DESCRIPTION OF THE DRAWINGS

The disclosed antitheft system may take physical form in certain parts and arrangement of parts, embodiments of which will be described in detail in this specification and illustrated in the accompanying drawings which form a part hereof and wherein.

IV. DETAILED DESCRIPTION

Figure 1:
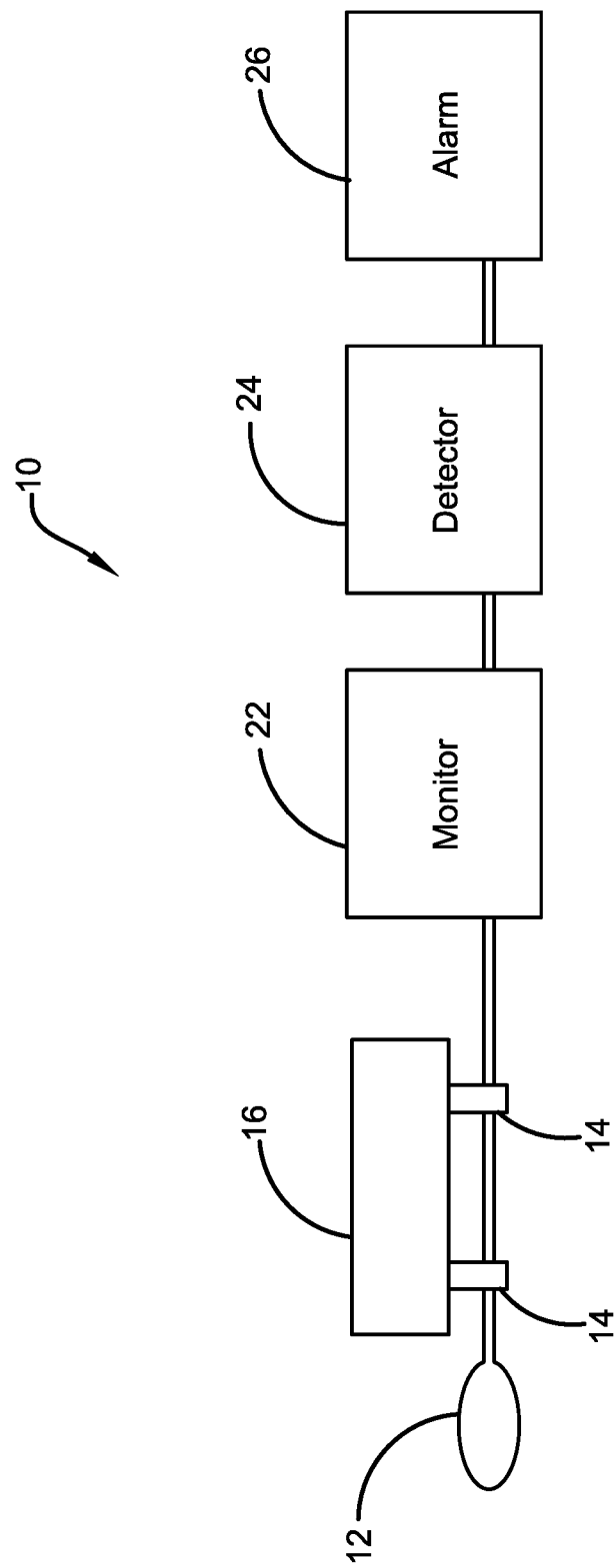
FIG. 1 is a block diagram generally depicting components of the present antitheft system in accordance with an exemplary embodiment.
Figure 2:
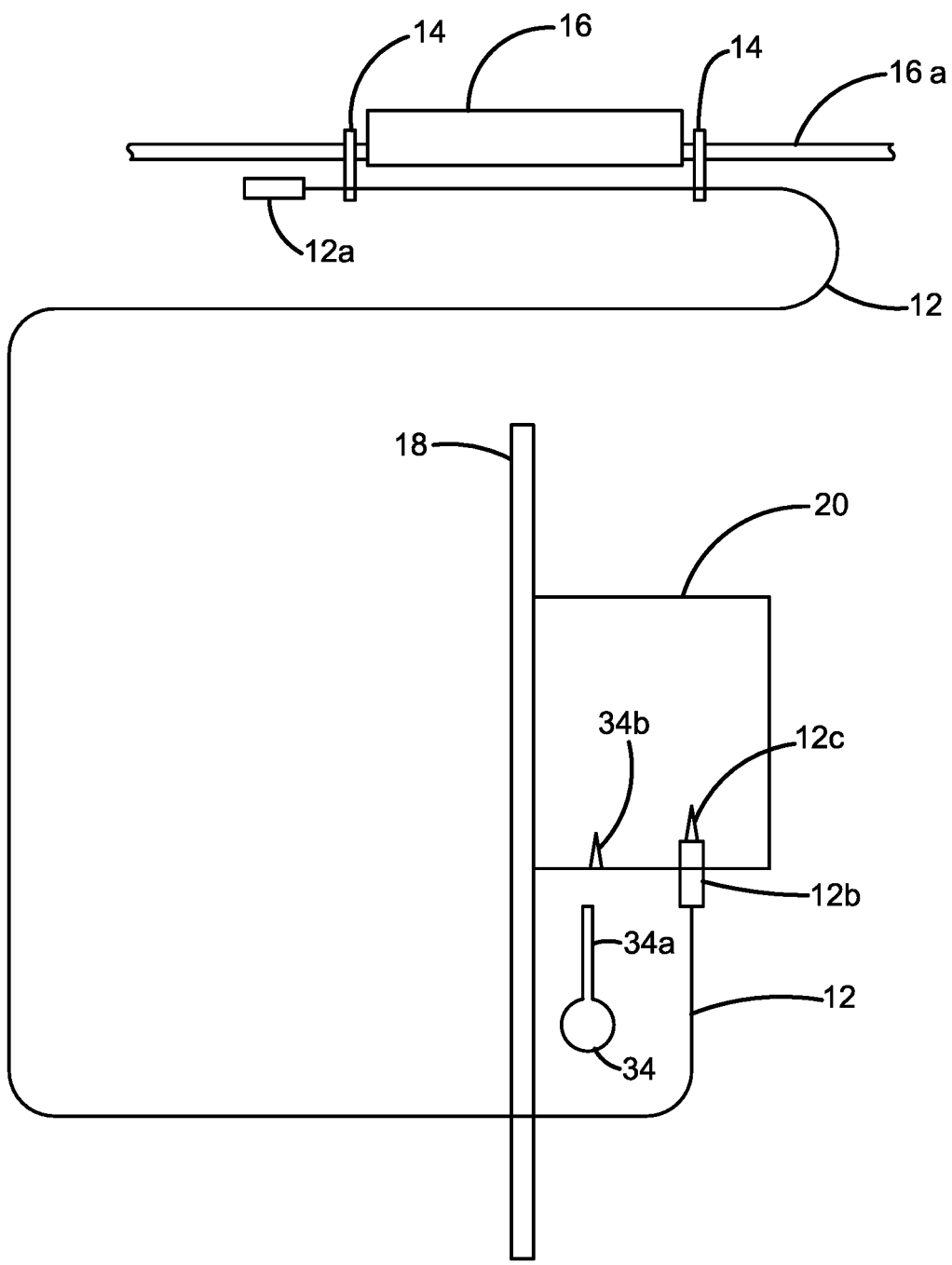
FIG. 2 is a high-level representation of the installation of the present antitheft system in a vehicle in accordance with an exemplary embodiment.

Referring now to the drawings wherein the showings are for purposes of illustrating embodiments of the article only and not for purposes of limiting the same, and wherein like reference numerals are understood to refer to like components:

FIG. 1 generally depicts an antitheft system 10 in accordance with an exemplary embodiment. A wire loop 12 is provided for conducting an electrical current to establish an electrical circuit. It is to be appreciated that the wire loop 12 is a wire having two ends that connect to the antitheft system 10 and looped over to produce a return wire having two portions that can be run concurrently together. In one aspect, in some implementations for use with parked vehicles, not to be operated at normal driving temperatures, the wire loop 12 can be a common, non-heat-or-weather-resistant coaxial cable having a looped end. In another aspect, in other implementations for use with driven vehicles, the wire loop 12 can be a weather-resistant, metal-clad return wire that can withstand temperatures up to 2800 degrees Celsius, such as might be encountered in close contact with an active automotive exhaust system. As shown in FIG. 2, the end of the wire loop 12 can include an end cap 12a, which could be formed of an adhesive bead, to define a terminal longitudinal extent of the return wire.

With further reference to FIG. 1, the antitheft system also includes one or more securing components 14 for securing some portion or the entirety of the wire loop 12 in contact with a device 16 to be protected from theft. In the preferred embodiment, as additionally depicted in FIG. 2, the device 16 to be protected can be an automotive catalytic converter, and the securing component(s) 14 can be one or more clamps for securing the wire loop 12 (or a portion thereof) alongside and adjacent to exhaust pipes 16a of a vehicle exhaust system including the catalytic converter 16. The clamps 14 are preferably looped around the tubular circumference of the exhaust pipes 16a with the wire loop 12 sandwiched between the clamps 14 and the catalytic converter 16.

As generally indicated in FIGS. 1 and 2, the clamps 14 are mounted snugly in close proximity with the ends of the catalytic converter 16 in a substantially abutting relationship, so as to not allow any gap between the clamps 14 and the converter 16. In this manner, any attempt to cut free the catalytic converter 16 (such as with a reciprocating saw, i.e., a "sawzall" or portable band saw) will result in severing the wire loop 12, thereby triggering the alarm (as explained in detail hereinbelow). Other clamps 14 can be placed circumferentially around the exhaust pipes 16a, along the longitudinal extent of the exhaust pipes 16a, in order to secure the wire loop 12 into close contact with the exhaust system.

As depicted in FIG. 2, the wire loop 12 is configured to run along the exhaust pipes 16a to enter into the engine compartment. An alarm module 20 can be retained in engine compartment of the vehicle, secured under the hood of the vehicle, preferably mounted to the side of the firewall 18 within the engine compartment. The alarm module 20 can be powered by the vehicle battery or by an independent battery. The wire loop 12 is then plugged into the alarm module 20 to implement the operation of the antitheft system 10.

As illustrated generally in FIG. 1, the antitheft system 10 includes a monitoring circuit 22, in electrical communication with the wire loop 12, for monitoring the electrical circuit established in the wire loop 12. This monitoring is performed to observe whether an unbroken current path is maintained through the wire loop 12, indicative of normal operation. A detector circuit 24 is connected to the monitoring circuit 22 for detecting a discontinuity in the electrical circuit indicative of a disconnection of the wire loop 12, as would occur in the event that the wire loop 12 is either severed during a theft attempt or unplugged in an attempt to circumvent and defeat the antitheft system 10. The discontinuity or current in the wire is detected by a control logic circuit (described in detail hereinbelow) with the result of no ground detected, which activates an audible alarm. The control logic circuit continuously verifies the continuity of the wire. Once activated, the alarm will continue to sound until the module is disabled, for example, by insertion of a key.

An alarm circuit 26 is connected to the detector circuit 24 for activating an alarm upon detection of the discontinuity in the electrical circuit indicative of severing the wire loop 12 in a theft attempt. A suitable alarm is issued upon activation, as will be explained in detail hereinbelow.

Figure 3:
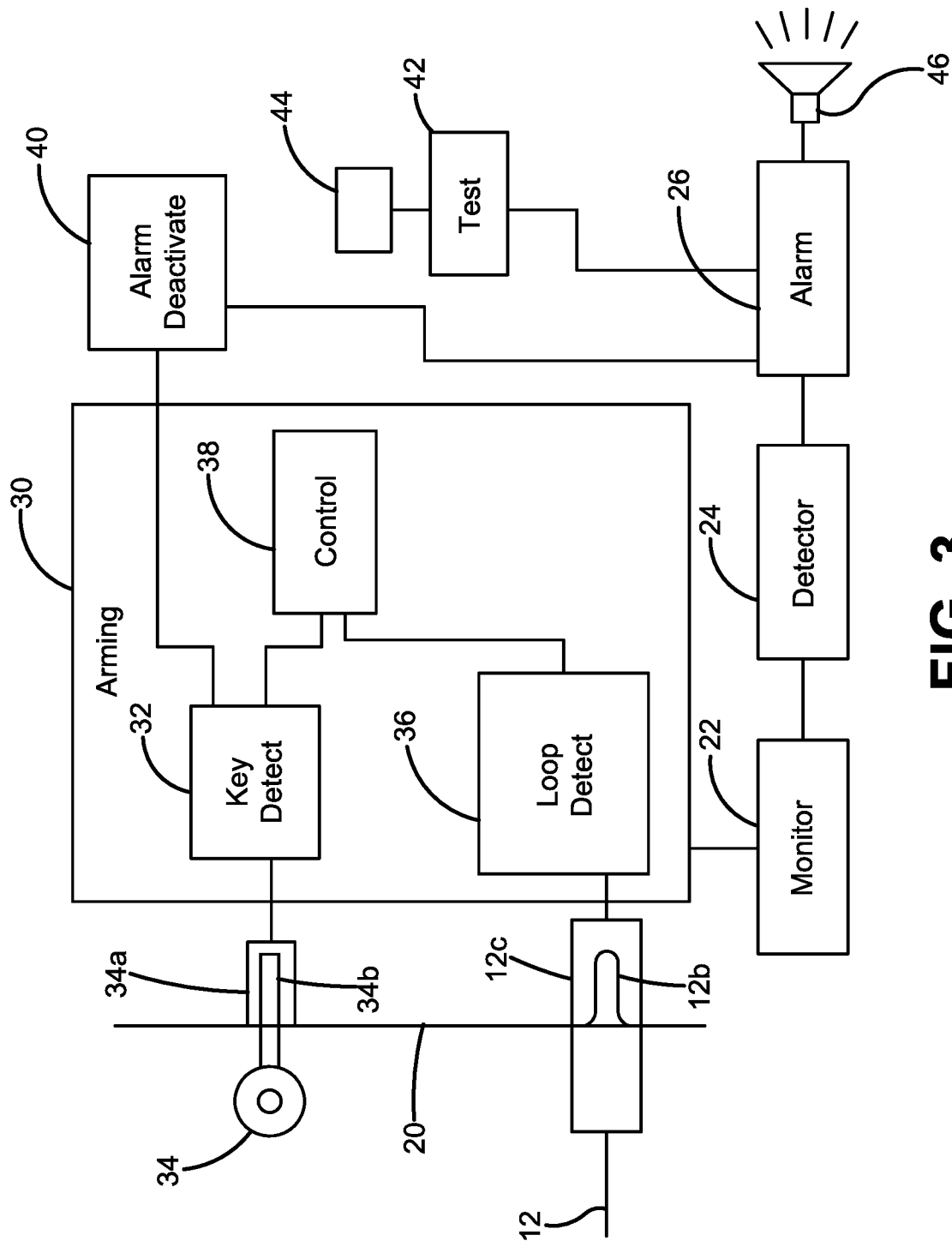
FIG. 3 is a schematic view depicting an alarm module with components in accordance with an exemplary embodiment.

With particular reference to FIG. 3, the present antitheft system 10 also includes a key-activated arming circuit 30 including a key detection circuit 32 for generating a key insertion signal indicative of insertion of a removable key 34. In one aspect, the key detection circuit 32 can be a key switch, actuated by insertion of the key, to generate the key insertion signal. The present system 10 also includes a wire loop detection circuit 36 for generating a wire loop insertion signal indicative of insertion of the wire loop 12 corresponding to establishment of the electrical circuit.

With continuing reference to FIG. 3, the arming circuit 30 also includes the aforementioned control logic circuit 38 which:

1) receives the key insertion signal from the key detection circuit 32,
2) subsequently receives the wire loop insertion signal from the wire loop detection circuit 36, and
3) subsequently arms the arming circuit 30.

The control logic circuit 38 can include processing circuitry to detect the order in which the signals are detected, that the key insertion signal is received first, followed by the wire loop insertion signal, so that the arming circuit 30 is only armed after these signals are received in this correct order. The arming circuit 30 is in communication with the monitoring circuit 22 so that the arming circuit 30 is only armed and activates the monitoring circuit 22 after the aforementioned signals are received in the correct order as indicated hereinabove.

With further continuing reference to FIG. 3, the present antitheft system 10 also includes an alarm deactivation circuit 40 for receiving a second key insertion signal from the key detection circuit 32 and deactivating the alarm circuit 26 to disable the alarm. In the event that the alarm is activated in the event of a theft attempt, the removable key 34 is inserted again, which generates another key insertion signal which is interpreted by the system 10 as a deactivation signal, thereby disabling the alarm.

With reference to FIGS. 2 and 3, the removable key 34 has a shaft 34a, preferably elongated and cylindrical. The key detection circuit 32 is configured to cooperate with a socket 34b, which is mounted onto an exterior of a housing (i.e., of the module 20). In this way, the socket 34b is configured for receiving the shaft 34a of the removable key 34. Similarly, the wire loop 12 is configured to terminate with a coaxial plug 12b for electrically connecting respective two ends of the wire loop 12. The wire loop detection circuit 36 is configured to cooperate with a coaxial socket 12c, mounted onto an exterior of the housing (i.e., the module 20), for receiving the coaxial plug 12c of the wire loop 12.

With ongoing reference to FIG. 3, the antitheft system 10 also includes a test circuit 42, including a user-actuated switch 44, where the test circuit 42 is connected to the alarm circuit 26, to enable a user to selectively for test activate the alarm. In one aspect, the switch 44 can be connected to a button mounted on the outside of the module 20, where pressing the button activates the alarm. In one aspect, the alarm preferably includes a sound transducer 46 for generating an audible alarm signal, which can deter a prospective thief from stealing the converter 16. However, depending on the desired implementation, the alarm can additionally or alternatively include a wireless connection to a network node which can transmit a signal which can, in turn, generate an audible and/or visual indicator observed in a remote location, such as a security office or police station. Further, the alarm can also optionally be armed using a key fob associated with the vehicle.

In the preferred embodiment, the present antitheft system 10 and the electronic circuits and components described hereinabove can be retained in the module 20, which is preferably a small box formed of plastic. A common type C battery can be used to power the system 10. However, the system 10 can be alternatively wired to receive power from the vehicle battery. Further, at least some of the present components for each vehicle can alternatively be distributed and located elsewhere as part of a networked antitheft distributed system, along with other similar components for other vehicles, all without departing from the present invention. In the preferred embodiment, the electronic circuits and components described hereinabove can be analog or digital circuits and components preferably mounted on one or more printed circuit boards and retained in the module 20. However, it is to be appreciated that at least some of the electronic circuits and other components described hereinabove can be alternatively implemented as software components in a computer system, all without departing from the present invention.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

1. An antitheft system for an automotive catalytic converter, comprising:
   a wire loop for conducting a current to establish an electrical circuit, wherein the wire loop comprises a common, non-heat-or-weather-resistant coaxial cable having a looped end, for use with parked vehicles, not to be operated at normal driving temperatures;
   at least one hose clamp for securing at least a portion of the wire loop alongside and adjacent to a vehicle exhaust system including the catalytic converter, wherein the at least one hose clamp is looped around a tubular circumference of the vehicle exhaust system with the wire loop sandwiched between the at least one hose clamp and the catalytic converter;
   a monitoring circuit, in electrical communication with the wire loop, for monitoring the electrical circuit established in the wire loop;
   a detector circuit, connected to the monitoring circuit, for detecting a discontinuity in the electrical circuit indicative of a disconnection of the wire loop;
   an alarm circuit, connected to the detector circuit, for activating an alarm upon detection of the discontinuity in the electrical circuit; and
   a key-activated arming circuit comprising a key detection circuit for detecting a key insertion signal indicative of insertion of a removable key, and a wire loop detection circuit for detecting a wire loop insertion signal indicative of insertion of the wire loop corresponding to establishment of the electrical circuit.

2. The antitheft system of claim 1, wherein the wire loop comprises a weather-resistant, metal-clad return wire capable of withstanding temperatures of 2800 degrees Celsius, for close contact with an active automotive exhaust system.

\* \* \* \* \*